US012645916B2

(12) United States Patent
O'Donoghue et al.

(10) Patent No.: US 12,645,916 B2
(45) Date of Patent: Jun. 2, 2026

(54) TECHNIQUES FOR MEASUREMENT DEVICE CALIBRATION MANAGEMENT USING CALIBRATION OFFSET GENERATION MACHINE LEARNING MODELS

(71) Applicant: Optum Services (Ireland) Limited, Dublin (IE)

(72) Inventors: Kieran O'Donoghue, Dublin (IE); Neill Michael Byrne, Dublin (IE); Michael J. McCarthy, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 1060 days.

(21) Appl. No.: 17/465,166

(22) Filed: Sep. 2, 2021

(65) Prior Publication Data

US 2023/0065854 A1    Mar. 2, 2023

(51) Int. Cl.
*G06N 3/044*        (2023.01)

(52) U.S. Cl.
CPC ................................... *G06N 3/044* (2023.01)

(58) Field of Classification Search
None
See application file for complete search history.

(56) References Cited

U.S. PATENT DOCUMENTS 7,087,018 B2    8/2006   Comaniciu et al.
7,142,901 B2    11/2006  Kiani et al.

10,342,469 B2    7/2019   Hayter et al.
10,638,979 B2    5/2020   Gupta et al.
10,716,518 B2    7/2020   Basu et al.
10,980,461 B2    4/2021   Simpson et al.
2019/0110755 A1  4/2019   Capodilupo et al.
(Continued)

OTHER PUBLICATIONS

"TIDC-CC2650STK-SENSORTAG Reference Design," TI.com, Texas Instruments, (7 pages), (online), [Retrieved from the Internet Nov. 15, 2021] <URL: https://www.ti.com/tool/TIDC-CC2650STK-SENSORTAG>.

(Continued)

*Primary Examiner* — Raymond L Nimox
(74) *Attorney, Agent, or Firm* — Alston & Bird LLP

(57) ABSTRACT

Various embodiments of the present invention utilize systems, methods, and computer program products that perform measurement device calibration management by utilizing calibration offset generation machine learning models that are generated using a model training routine that comprises, for each measurement environment feature value: (i) determining a plurality of inferred measurements by a measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and (ii) generating the calibration offset generation machine learning model based at least in part on comparing the plurality of inferred measurements and a ground-truth measurement output for the ground-truth measurement operation.

17 Claims, 9 Drawing Sheets

(56) References Cited

U.S. PATENT DOCUMENTS

| | | | |
|---|---|---|---|
| 2020/0038588 A1 | 2/2020 | Varsavsky et al. | |
| 2021/0077717 A1 | 3/2021 | Srinivasan et al. | |
| 2021/0326723 A1* | 10/2021 | Kumar | G06N 5/04 |

OTHER PUBLICATIONS

Ginsberg, Barry H. "Factors Affecting Blood Glucose Monitoring—Sources of Errors In Measurement," Journal of Diabetes Science and Technology, vol. 3, No. 4, pp. 903-913, Jul. 2009, DOI: 10.1177/193229680900300438, PMCID: PMC2769960, PMID: 20144340.

Wang, Yuzhi et al. "A Deep Learning Approach For Blind Drift Calibration of Sensor Networks," IEEE Sensors Journal, vol. 17, No. 13, Jul. 1, 2017, pp. 4158-4171.

Wei, Peng et al. "Impact Analysis Of Temperature and Humidity Conditions On Electrochemical Sensor Response In Ambient Air Quality Monitoring," Sensors, vol. 18, No. 59, pp. 1-16, Jan. 23, 2018, DOI: 10.3390/s18020059.

* cited by examiner

100

Client Computing Entities 102

Predictive Data Analysis Computing Entity 106

Storage Subsystem 108

Predictive Data Analysis System 101

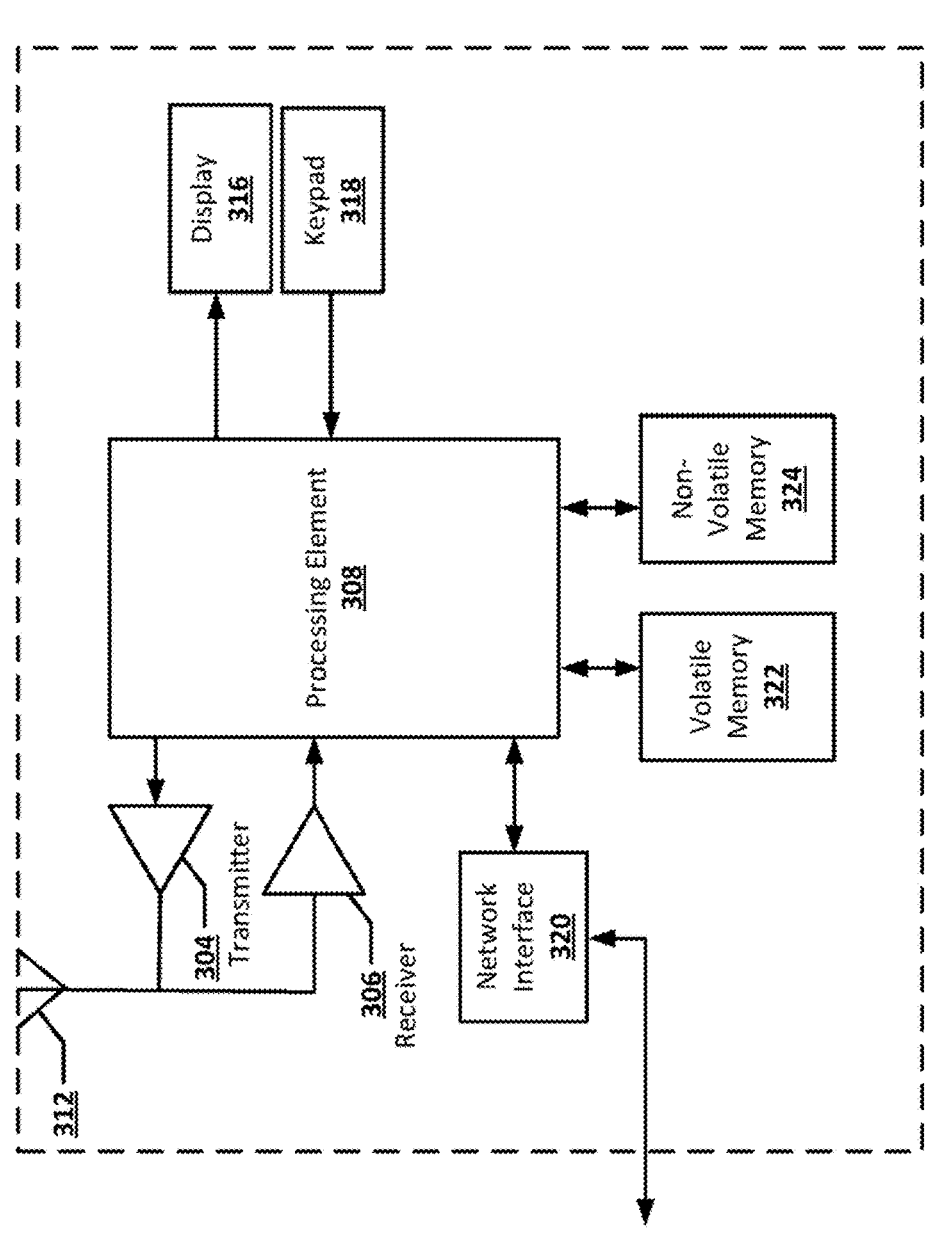
FIG. 3

Identify measurement environment features
401

Determine inferred outputs
402

Generate a calibration offset generation machine learning model
402

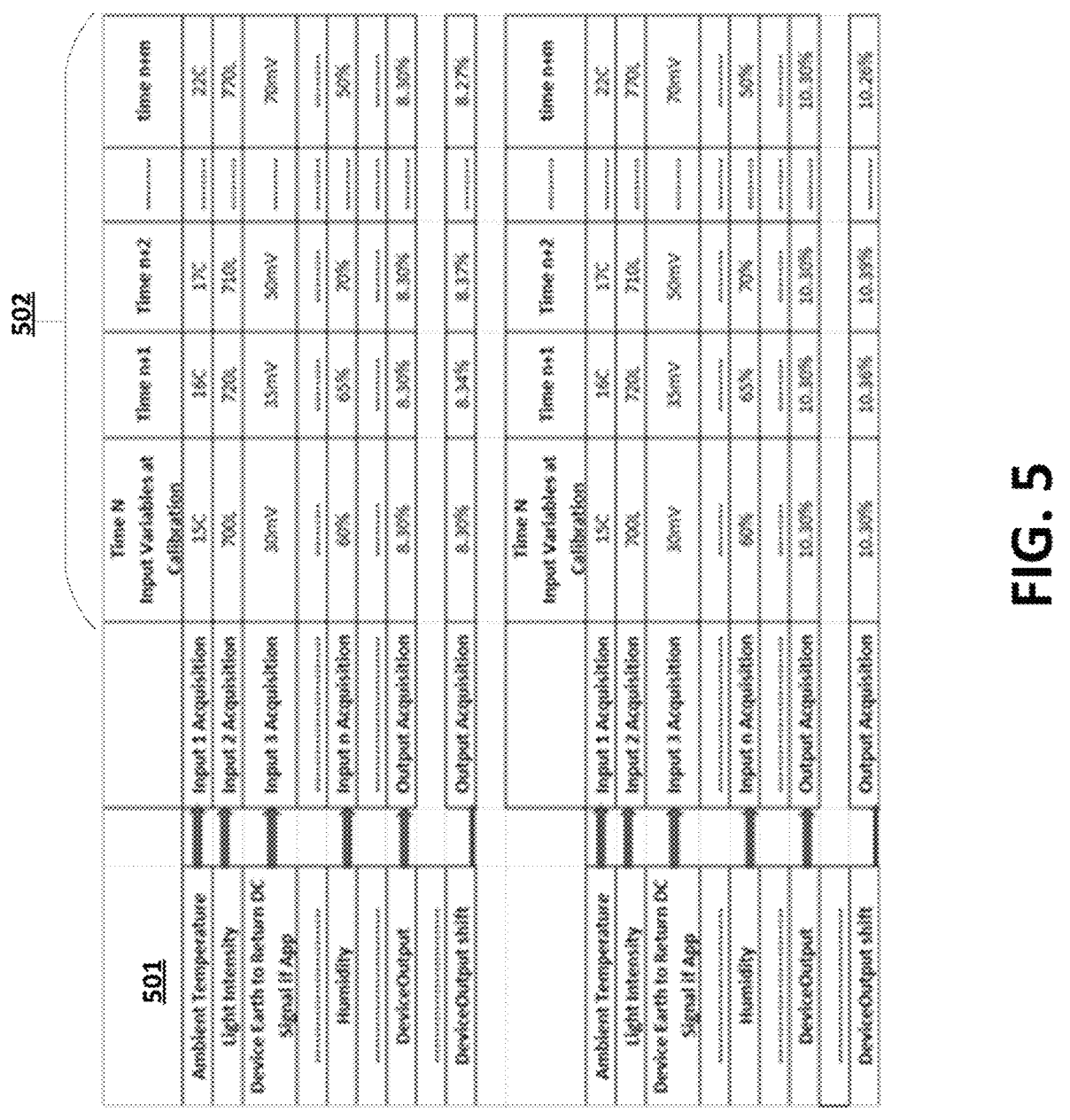

502

| 501 | | Time N Input Variables at Calibration | Time n+1 | Time n+2 | ...... | time n+n |
|---|---|---|---|---|---|---|
| Ambient Temperature | Input 1 Acquisition | 1C | 1C | 1C | ------ | 2C |
| Light Intensity | Input 2 Acquisition | 70L | 72L | 72L | ------ | 72L |
| Device Earth to Return DC Signal I Age | Input 3 Acquisition | 30mV | 35mV | 50mV | ------ | 70mV |
| Humidity | Input n Acquisition | 60% | 65% | 70% | ------ | 50% |
| Device Output | Output Acquisition | 9.99% | 9.99% | 9.99% | ------ | 8.99% |
| Device/Output shift | Output Acquisition | 9.99% | 9.94% | 9.97% | ------ | 9.97% |

| | | Time N Input Variables at Calibration | Time n+1 | Time n+2 | ...... | time n+n |
|---|---|---|---|---|---|---|
| Ambient Temperature | Input 1 Acquisition | 1C | 1C | 1C | ------ | 2C |
| Light Intensity | Input 2 Acquisition | 70L | 72L | 72L | ------ | 72L |
| Device Earth to Return DC Signal I Age | Input 3 Acquisition | 30mV | 35mV | 50mV | ------ | 70mV |
| Humidity | Input n Acquisition | 60% | 65% | 70% | ------ | 50% |
| Device Output | Output Acquisition | 10.99% | 10.99% | 10.99% | ------ | 10.99% |
| Device/Output shift | Output Acquisition | 10.99% | 10.99% | 10.99% | ------ | 10.99% |

FIG. 5

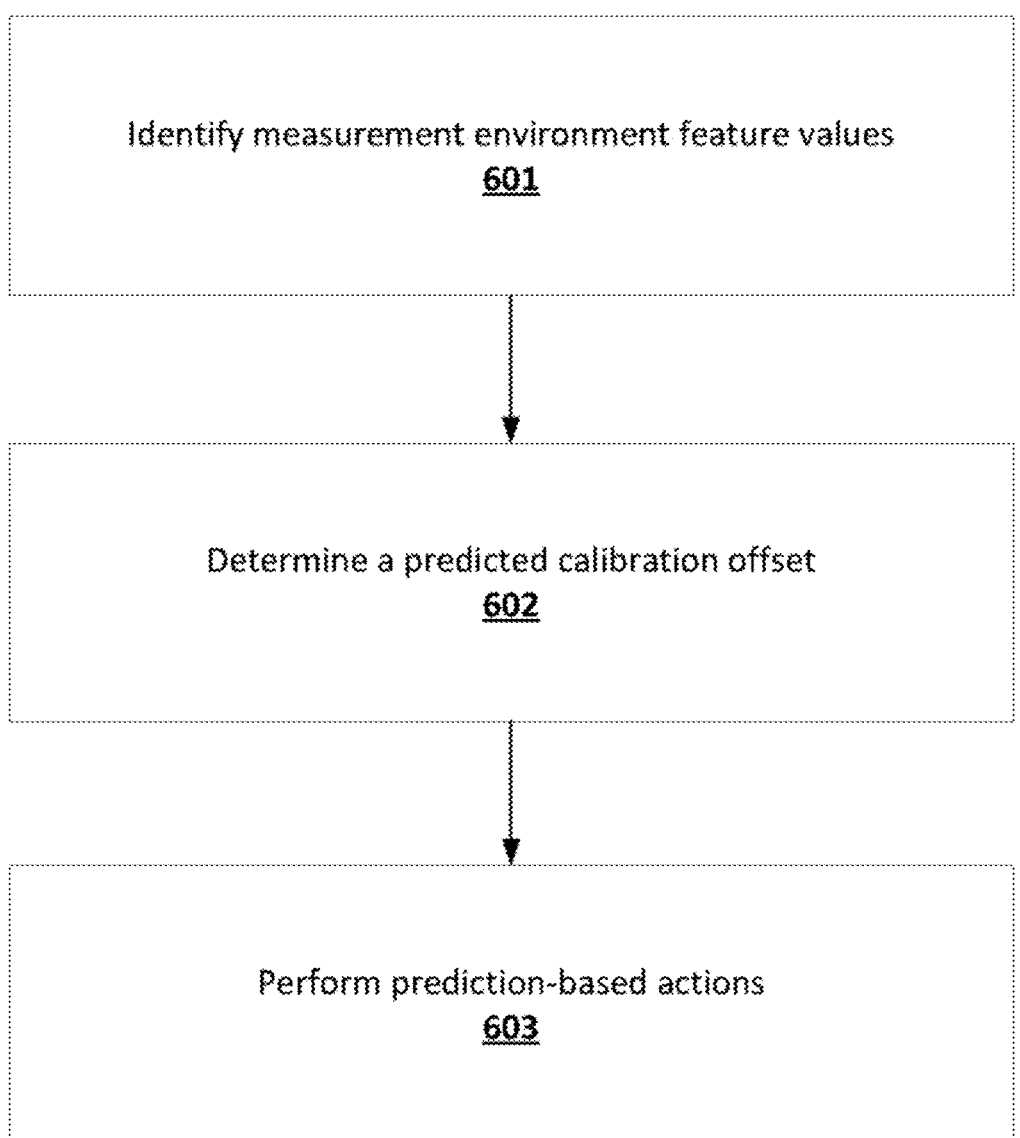
FIG. 6

TECHNIQUES FOR MEASUREMENT DEVICE CALIBRATION MANAGEMENT USING CALIBRATION OFFSET GENERATION MACHINE LEARNING MODELS

BACKGROUND

Various embodiments of the present invention address technical challenges related to performing measurement device calibration management and address the efficiency and reliability shortcomings of existing measurement device calibration management solutions.

BRIEF SUMMARY

In general, embodiments of the present invention provide methods, apparatus, systems, computing devices, computing entities, and/or the like for measurement device calibration management. For example, certain embodiments of the present invention utilize systems, methods, and computer program products that perform measurement device calibration management by utilizing calibration offset generation machine learning models that are generated using a model training routine that comprises, for each measurement environment feature value: (i) determining a plurality of inferred measurements by a measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and (ii) generating the calibration offset generation machine learning model based at least in part on comparing the plurality of inferred measurements and a ground-truth measurement output for the ground-truth measurement operation.

In accordance with one aspect, a method is provided. In one embodiment, the method comprises: identifying a plurality of measurement environment feature values of the measurement device, wherein the plurality of measurement environment features values are associated with a measurement operation associated with the measurement output; determining, based at least in part on the plurality of measurement environment feature values and by utilizing a calibration offset generation machine learning model, the predicted calibration offset, wherein the calibration offset generation machine learning model is generated using a model training routine that comprises, for each measurement environment feature value: determining a plurality of inferred measurements by the measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and generating the calibration offset generation machine learning model based at least in part on comparing the plurality of inferred measurements and a ground-truth measurement output for the ground-truth measurement operation; and performing one or more prediction-based actions based at least in part on the predicted calibration offset.

In accordance with another aspect, a computer program product is provided. The computer program product may comprise at least one computer-readable storage medium having computer-readable program code portions stored therein, the computer-readable program code portions comprising executable portions configured to: identify a plurality of measurement environment feature values of the measurement device, wherein the plurality of measurement environment features values are associated with a measurement operation associated with the measurement output; determine, based at least in part on the plurality of measurement environment feature values and by utilizing a calibration offset generation machine learning model, the predicted calibration offset, wherein the calibration offset generation machine learning model is generated using a model training routine that comprises, for each measurement environment feature value: determining a plurality of inferred measurements by the measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and generating the calibration offset generation machine learning model based at least in part on comparing the plurality of inferred measurements and a ground-truth measurement output for the ground-truth measurement operation; and perform one or more prediction-based actions based at least in part on the predicted calibration offset.

In accordance with yet another aspect, an apparatus comprising at least one processor and at least one memory including computer program code is provided. In one embodiment, the at least one memory and the computer program code may be configured to, with the processor, cause the apparatus to: identify a plurality of measurement environment feature values of the measurement device, wherein the plurality of measurement environment features values are associated with a measurement operation associated with the measurement output; determine, based at least in part on the plurality of measurement environment feature values and by utilizing a calibration offset generation machine learning model, the predicted calibration offset, wherein the calibration offset generation machine learning model is generated using a model training routine that comprises, for each measurement environment feature value: determining a plurality of inferred measurements by the measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and generating the calibration offset generation machine learning model based at least in part on comparing the plurality of inferred measurements and a ground-truth measurement output for the ground-truth measurement operation; and perform one or more prediction-based actions based at least in part on the predicted calibration offset.

BRIEF DESCRIPTION OF THE DRAWINGS

Figure 1:

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
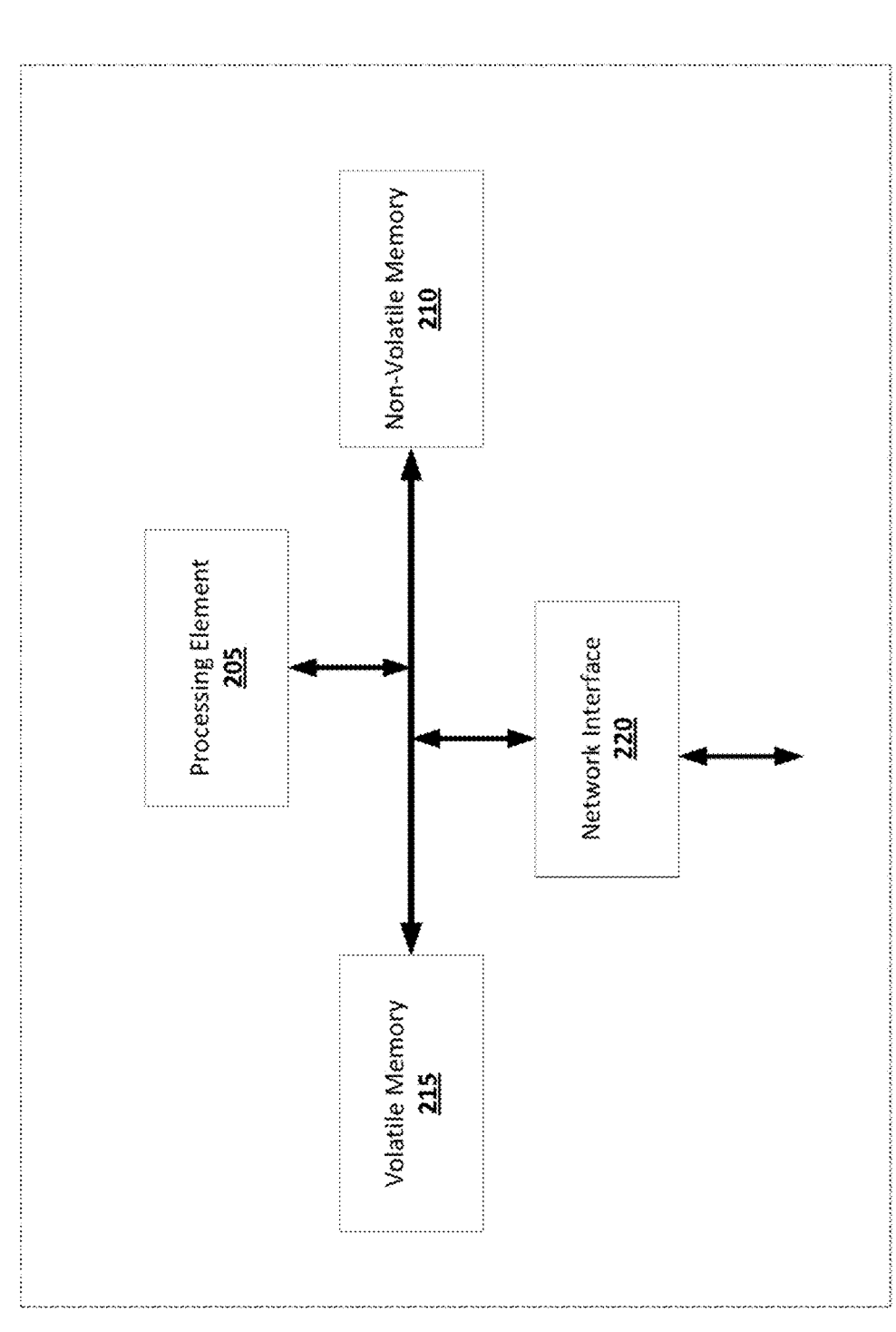

FIG. 2 provides an example predictive data analysis computing entity in accordance with some embodiments discussed herein.

FIG. 3 provides an example client computing entity in accordance with some embodiments discussed herein.

Figure 4:

FIG. 4 is a flowchart diagram of an example process for generating a calibration offset generation machine learning model in accordance with some embodiments discussed herein.

FIG. 5 provides an operational example of varying a set of measurement environment features across per-feature spectrums for those measurement environment features in accordance with some embodiments discussed herein.

FIG. 6 is a flowchart diagram of an example process for generating a predicted calibration offset for a measurement operation using a calibration offset generation machine learning model in accordance with some embodiments discussed herein.

Figure 7:
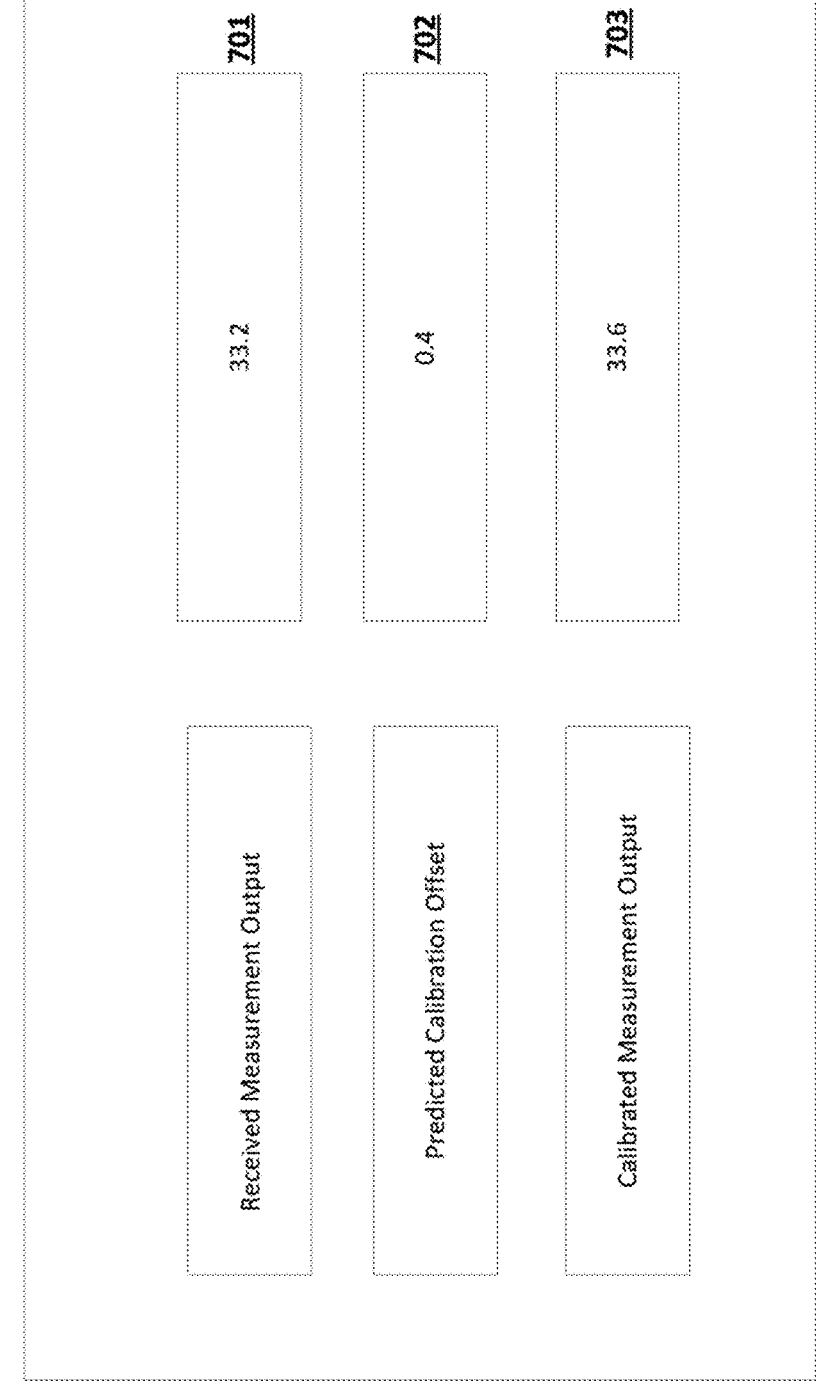

FIG. 7 provides an operational example of a prediction output user interface that displays the measurement output for a measurement operation, the predicted calibration offset for the measurement operation, and the calibrated measurement output for the measurement output, in accordance with some embodiments discussed herein.

Figure 8:
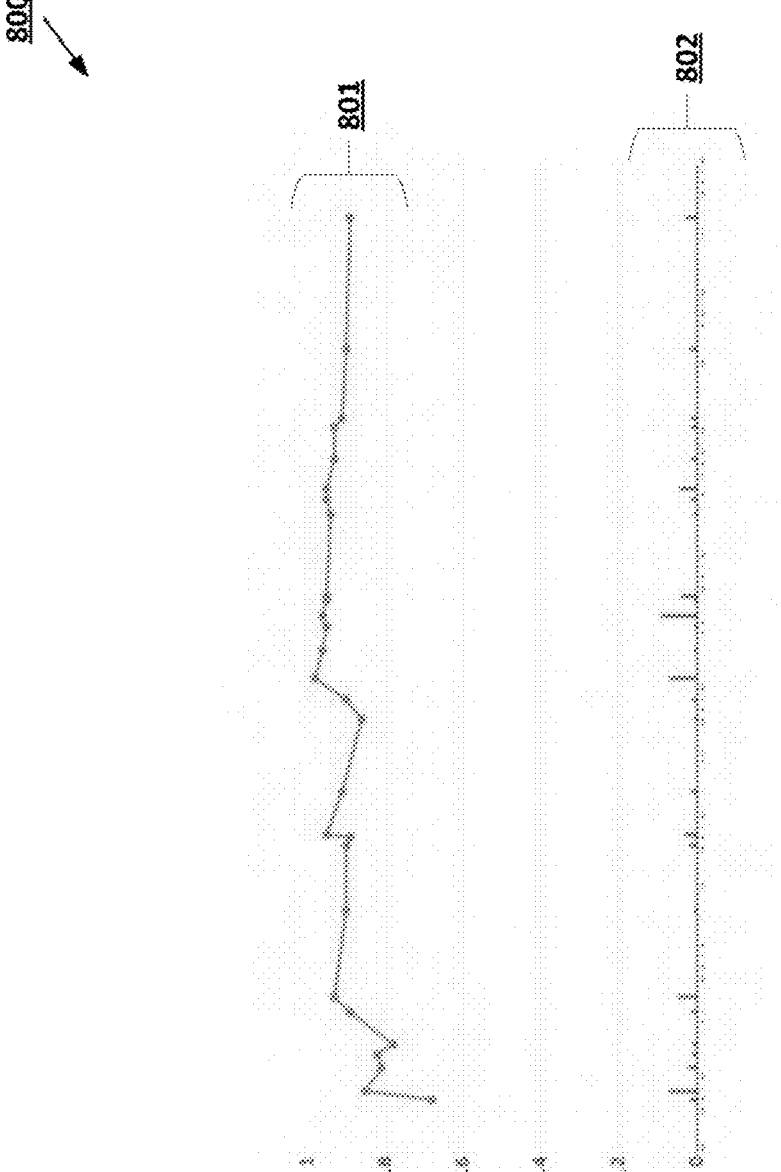

FIG. 8 provides an operational example of a prediction output user interface that displays a measure of how much a set of measurement operations across time contribute to measures of device drift, in accordance with some embodiments discussed herein.

Figure 9:
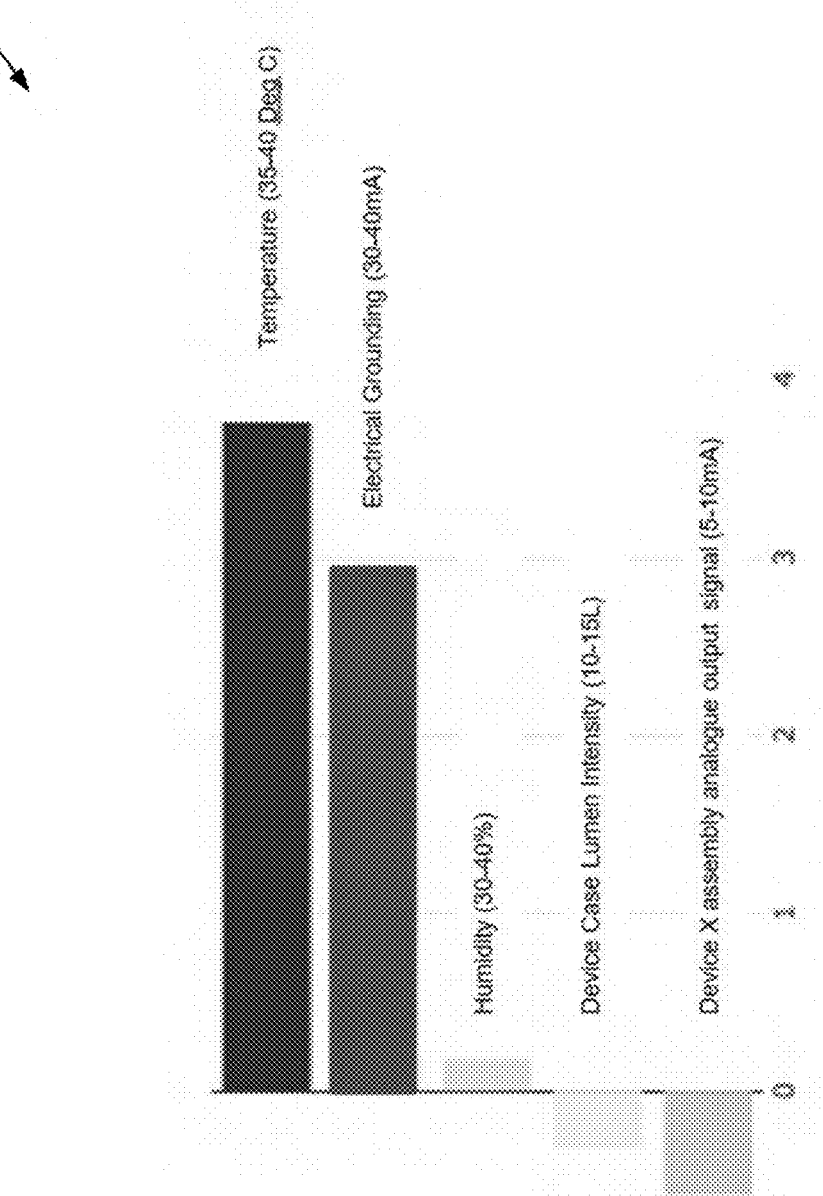

FIG. 9 provides an operational example of a prediction output user interface that displays, for a corresponding timestep, how measurement environment feature values associated with the measurement operation of the corresponding timestep have contributed to a measure of deice drift for the timestep, in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Improvements

Various embodiments of the present invention introduce techniques for generating predicted calibration offsets for measurement operations that can in turn be used to generate calibrated measurement outputs. By providing functionalities that are configured to generate calibrated measurement outputs without performing measurement device recalibration, various embodiments of the present invention reduce the number of device recalibration operations that need to be performed on measurement devices. In doing so, various embodiments of the present invention improve the computational efficiency of performing measurement device calibration management and reduce computational load on measurement device calibration management frameworks.

For example, various embodiments of the present invention introduce techniques for generating predicted calibration offsets by utilizing calibration offset generation machine learning models, where the noted calibration offset generation machine learning models that are generated using a model training routine that comprises, for each measurement environment feature value: (i) determining a plurality of inferred measurements by a measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and (ii) generating the calibration offset generation machine learning model based at least in part on comparing the plurality of inferred measurements and a ground-truth measurement output for the ground-truth measurement operation. Once generated, predicted calibration offsets can be used to generate calibrated measurement outputs without performing measurement device recalibration. In this way, various embodiments of the present invention improve the computational efficiency of performing measurement device calibration management and reduce computational load on measurement device calibration management frameworks.

An exemplary application of various embodiments of the present invention relates to techniques for calibration management of lab diagnostic devices. Lab diagnostic devices are critical to diagnosing and guiding patient healthcare in relation to chronic disease. Examples of such devices are Hematology analyzers that perform standard complete blood count measurements and immunology analyzers which run automated biochemical tests to detect the presence and concentration of substances in the samples. These lab diagnostic devices may be highly complex pieces of instrumentation encompassing electronics, mechanics, fluidics, chemicals, software and complex analytics to get critical diagnostic outputs to guide patient healthcare decisions. Due to the complexity of the noted lab diagnostic devices, it is very technically challenging to ensure the best possible ground truth accuracy and repeatability of measurements are maintained through time after calibration of these devices. As these lab diagnostic devices become more complex and their specification requirements become tighter, solutions to enable better accuracy and repeatability will be vital. For illustration purposes we outline some examples of where enhancing diagnostic accuracy of lab diagnostic devices would be beneficial.

A first example relates to troponin measurement. Troponin is a type of protein found in the muscles of a person's heart. Troponin is not normally found in the blood. When heart muscles become damaged, troponin is sent into the bloodstream. As heart damage increases, greater amounts of troponin are released in the blood. This is an example of sensitive immunology assay where the upmost accuracy and repeatability of measurement is needed. There are many steps involved in creating the complex Chemiluminescence reaction to measure the concentration of troponin in the bloodstream, and any opportunity to enhance the accuracy and repeatability of this assay would be extremely beneficial particularly for borderline suspects.

Another example is complete blood count measurements. During a typical end to end cycle of the measurement, there are multiple sequential steps for: (i) mechanical preparation and presentation of the blood sample, (ii) pneumatic aspiration, (iii) sample mixing with reagents, (iv) sample heating and parallel pneumatic presentation of the sample for optical characterization, and (v) cell characterization through direct flow cytometry. In some embodiments, many steps are involved in creating the final outputs and any opportunity to ensure the results can be as accurate and stable as possible should be used to enable the best clinical decision making. White blood cells and their subtypes Monocytes, Lymphocytes, Neutrophils are particularly important for immunity response; therefore, knowing results related to these white blood cells and their subtypes more accurately for borderline patients is very important.

Although approved devices may work within their design and manufacturing constraints, any opportunity to make outputs more accurate would be highly beneficial particularly for patients on diagnostic threshold levels. Aspects of various embodiments of the present invention utilize advances in data acquisition and machine learning (ML) to enhance diagnostic device accuracy. They do this by normalizing the impacts of multiple internal device component drifts and external variables.

In some embodiments, a proposed solution integrates diagnostic both internal device and external environment considerations into interpreting diagnostic testing results. In some cases, lab diagnostic devices operate in conditions outside their proposed specification ranges, such as with extremely high uncontrolled temperature and humidity conditions. Aspects of various embodiments of the present invention enable these extremities to be accounted for in interpreting diagnostic testing results to enable obtaining more accurate inferred results in situations where operational extremities exist. In some embodiments, various embodiments of the present invention normalize device component drift and external variable changes over time to enhance device accuracy after device calibration. They accomplish this objective via continuously augmenting the final output via a model that calibrates out impacts related to device component drift and external variable change. This augmentation is done through a timeseries-based model that maps key signals both internal and external to the device that continuously change over time and understands the collective impacts of the noted key signals on the device output. The timeseries-based model learns how small changes over time impact the final device output and accordingly re-calibrates the device for enhanced accuracy.

II. Definitions

The term "measurement environment feature value" may refer to a data entity that is configured to describe a value for a measurement environment feature, where the measurement environment feature is configured to describe a property associated with an operational environment of a measurement device during a time associated with a corresponding measurement operation. Examples of measurement environment features comprise measurement device internal features that describe properties of a corresponding measurement device during a time associated with a corresponding measurement operation and measurement device external environment features that describe properties of an external environment of a measurement device during a time associated with a corresponding measurement operation.

The term "measurement device internal feature value" may refer to data entity that is configured to describe a value for a measurement device internal feature, where the measurement device internal feature is configured to describe properties of a corresponding measurement device during a time associated with a corresponding measurement operation. Examples of measurement device internal features include electrical noise features. For devices that require an external power source unit (PSU), the ideal delta between "Earth ground" and "return direct current (DC)" signal line should be zero volts. Small variances in this delta can exist due to the varying PSU and variance in Printed Circuit Board Assembly (PCBA) components from device to device. This can ultimately impact signal accuracy and repeatability of measurement devices due to electrical noise impacting DC signal quality particularly for very low signal detection in the uA and pA territory. In some embodiments, being able to characterize how varying DC electrical noise impacts accuracy and monitoring and calibrating this out offers another way to improve device accuracy. Other examples of measurement device internal features include within-device component drift features. Within a measurement device, there may be thousands of components (e.g., electronic components, mechanical components, calibrators, reagents, and/or the like) that make up the solution. Each of these components may have specific design specifications and the final device then may have a required design specification. Each component may have individual variations in performance. In some embodiments, tapping into key signals within a measurement device and continually monitoring them and understanding how their changes impact the device measurement output is yet another opportunity to enhance measurement accuracy.

The term "measurement device external environment feature value" may refer to data entity that is configured to describe a value for a measurement device external environment feature, where the measurement device external environment feature is configured to describe properties of an external environment of a measurement device during a time associated with a corresponding measurement operation. Examples of measurement device external environment feature include operational location features. In some embodiments, the operating position of a device can impact the accuracy and performance output of the device. For example, stray light variation through the day may impact an optical reading of a photo-diode. As another example, variations in the level of vibration in relation to an operating device may change through the day and impact repeatability of the operating device. Other examples of measurement device external environment feature include ambient temperature/humidity features. Many devices are designed to work within certain Lab operating conditions such as with particular temperature requirements and/or humidity requirements. In some cases, if the ambient temperature is too high and or low then the stability of the device may be unacceptable. Even within the acceptable specifications, temperature/humidity changes may impact the device output so continual fine tuning in relation to temperature and humidity is an opportunity for improved accuracy. Also, where a lab has an operating condition outside of proposed specifications, fine tuning of the impact on ground-truth model outputs can be useful.

The term "measurement device" may refer to a hardware device that is configured to generate a measurement output via performing a measurement operation. Examples of measurement devices include lab diagnostic devices. Lab diagnostic devices are critical to diagnosing and guiding patient healthcare in relation to chronic disease. Examples of such devices are Hematology analyzers that perform standard complete blood count measurements & Immunology analyzers which run automated biochemical tests to detect the presence and concentration of substances in the samples to name but a few. These devices are typically highly complex pieces of instrumentation encompassing electronics, mechanics, fluidics, chemicals, software and complex analytics to get critical diagnostic outputs to guide patient healthcare decisions. Due to the complexity of these lab diagnostic devices, it is very technically challenging to ensure the best possible ground truth accuracy and repeatability of measurements are maintained through time after calibration of these devices. As these lab diagnostic devices become more complex and their specification requirements become tighter, solutions to enable better accuracy and repeatability will be vital. Examples of lab diagnostic devices include troponin measurement devices, blood count measurement devices, genetic modeling devices used in whole exome sequencing (WES) pipelines and/or whole genome sequencing (WGS) pipelines.

The term "measurement operation" may refer to a hardware operation performed by a measurement device to measure and report a property of a real-world phenomenon as a measurement output. Examples of measurement operations include measurement operations to measure troponin in heart muscles of an individual, measurement operations to measure white blood cell count of an individual, measurement operations to measure red blood cell count of an individual, measurement operations to measure Monocyte count of an individual, measurement operations to measure Lymphocyte count of an individual, measurement operations to measure Neutrophil count of an individual, measurement operations to measure genetic properties used in whole exome sequencing (WES) pipelines and/or whole genome sequencing (WGS) pipelines, and/or the like.

The term "ground-truth measurement operation" may refer to a measurement operation whose ideal (i.e., desired) measurement output is known independent of (i.e., without the need to resort to) the ground-truth measurement operation. Examples of ground-truth measurement operations include performing a measurement operation to determine a measured value for a particular property of a synthetic blood product, where the particular property of the synthetic blood product is already known. The ideal/desired measurement output associated with a ground-truth measurement operation is referred to herein as the "ground-truth measurement output" for the ground-truth measurement operation. For example, in some embodiments, if the ground-truth measurement operation aims to determine a measured value for white blood cell count of a particular synthetic blood product, the actual white blood cell count of the particular synthetic blood product might be known by virtue of the fact that the particular synthetic blood product is synthetic. In general, any synthetic and/or non-synthetic product can be used as an input for a ground-truth measurement operation so long as the ideal/desired property of the synthetic product is known independent of the ground-truth measurement operation.

The term "inferred measurement" may refer to a measurement output of performing a ground-truth measurement operation using a measurement device while varying a corresponding measurement environment feature value of the measurement device. In some embodiments, given a measurement device that is associated with n measurement environment feature values for n measurement environment features, each of the n measurement environment features may be varied across a per-feature spectrum for the measurement environment feature. After every variation of a measurement environment feature, a ground-truth measurement operation may be performed to generate an inferred measurement. Accordingly, for example, given a measurement device that is associated with a measurement environment features, where each of the measurement environment features can have b potential values in its respective per-feature spectrum, the measurement device may be associated with up to a*b inferred features. As another example, given a measurement device that is associated with four measurement environment features, where the first measurement environment feature is associated with a potential values in its respective per-feature spectrum, the second measurement environment feature is associated with b potential values in its respective per-feature spectrum, the third measurement environment feature is associated with c potential values in its respective per-feature spectrum, and the first measurement environment feature is associated with d potential values in its respective per-feature spectrum, the measurement device may be associated with up to a+b+c+d inferred features. Although various embodiments of the present invention describe that an inferred measurement is generated by performing a ground-truth measurement operation while varying one of the measurement environment features of the measurement device, a person of ordinary skill in the relevant technology that an inferred measurement is generated by performing a ground-truth measurement operation while varying more than one of the measurement environment features of the measurement device, for example, while varying up to m measurement environment features of the measurement device, where m may be a configurable hyper-parameter value.

The term "per-feature spectrum" may refer to a data entity that is configured to describe a set of potential values of a measurement environment feature across which the measurement environment features may be varied to generate inferred measurements in relation to a ground-truth measurement operation. In some embodiments, when the set of all potential/probable values of a measurement environment feature is a discrete set, the per-feature spectrum for the measurement environment feature may include all or part of the discrete set. In some embodiments, when the set of all potential/probable values of a measurement environment feature is a continuous set, the per-feature spectrum for the measurement environment may include a discrete subset of the continuous set, for example a discrete subset of the continuous set that includes values selected to be representative of the entire spectrum of the continuous set. For example, if a potential humidity measure of a measurement device is described by the set [1.01%, 2.00%], then the per-feature spectrum of the potential humidity measure future may include the set {1.01%, 1.02%, 1.03%, 1.04%, 1.05%, 1.06%, 1.07%, 1.08%, 1.09%, 2.00%}.

The term "calibration offset generation machine learning model" may refer to a data entity that is configured to describe parameters, hyper-parameters, and/or defined operations of a machine learning model that is configured to process a plurality of measurement environment feature values of a measurement device in relation to a measurement operation in order to generate a predicted calibration offset for the measurement operation. In some embodiments, the calibration offset generation machine learning model comprises a recurrent neural network. In some embodiments, the recurrent neural network is configured to, during each current operational timestep that is associated with a sequenced measurement operation, determine a current hidden state for the current operational timestep based at least in part on the plurality of measurement environment feature values for the sequenced measurement operation and a preceding hidden state for a preceding operational timestep, and the predicted calibration offset for each sequenced measurement operation is determined based at least in part on the current hidden state for the current operational timestamp that is associated with the sequenced measurement operation. In some embodiments, the recurrent neural network is a long-short term memory network. In some embodiments, the long-short term memory network is a bidirectional long-short term memory network. In some embodiments, the bidirectional long-short term memory network is an attention-based bidirectional long-short term memory network with an attention mechanism. In some embodiments, the calibration offset generation machine learning model is generated using a model training routine that comprises, for each measurement environment feature value of a measurement operation of a measurement device: determining a plurality of inferred measurements by the measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and generating the calibration offset generation machine learning model based at least in part on comparing the plurality of inferred measurements and a ground-truth measurement output for the ground-truth measurement operation. In some embodiments, given a set of inferred measurements and a ground-truth measurement output for the ground-truth measurement operation that is used to generate the inferred measurements, for each inferred measurement that is associated with a simulated measurement condition defined by a set of measurement environment feature values, the calibration offset generation machine learning model is trained (e.g., using a training routine such as a ground-truth training routine comprising at least one of stochastic gradient descent, batch gradient descent, backpropagation, backpropagation through time, and/or the like) to detect a measure of deviation between the inferred measurement and the ground-truth measurement output based at least in part on the set of measurement environment feature values associated with the corresponding simulated measurement condition. In some embodiments, inputs to a calibration offset generation machine learning model include vectors each characterizing a set of measurement environment feature values for a measurement operation. In some embodiment, the outputs of a calibration offset generation machine learning model include an atomic value representative of the predicted calibration offset for a measurement operation.

The term "predicted calibration offset" may refer to a data entity that is configured to describe a prediction about deviation of a measurement output of a measurement operation with a desired/ideal/actual value for the property that the corresponding measurement operation seeks to ideally/desirably measure/record/report. In some embodiments, the predicted calibration offset for a measurement operation is generated by processing a plurality of measurement environment feature values for the corresponding measurement operation using a calibration offset generation machine learning model. In some embodiments, inputs to a calibration offset generation machine learning model include vectors each characterizing a set of measurement environment feature values for a measurement operation. In some embodiment, the outputs of a calibration offset generation machine learning model include an atomic value representative of the predicted calibration offset for a measurement operation. In some embodiments, a predicted calibration offset is used to perform one or more prediction-based actions. In some embodiments, performing the one or more prediction-based actions comprises determining a calibrated measurement output based at least in part on the measurement output and the predicted calibration offset; and performing the one or more prediction-based actions based at least in part on the calibrated measurement output. In some embodiments, performing the one or more prediction-based actions comprises determining whether the predicted calibration offset satisfies a predicted calibration offset threshold; and in response to determining that the predicted calibration offset satisfies the predicted calibration offset threshold, automatically performing one or more device recalibration operations for the measurement device.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for generating a calibrated measurement output for an actual measurement output of a measurement device. Another example of a prediction-based action that can be performed using the predictive data analysis system 101 is a request for automatically recalibrating a measurement device when a predicted calibration offset for the measurement device satisfies a predicted calibration offset threshold.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Provided below are exemplary techniques for generating a calibration offset generation machine learning model and for using a trained calibration offset generation machine learning model to generate predicted calibration offsets. However, a person of ordinary skill in the relevant technology will recognize that: (i) the techniques described herein for using a trained calibration offset generation machine learning model to generate predicted calibration offsets can be performed by using a trained calibration offset generation machine learning model that is generated using techniques other than the model generation techniques described herein, and (ii) the techniques described herein for generating a calibration offset generation machine learning model can be used to generate trained calibration offset generation machine learning models that can be used as part of model inference routines that diverge from the model inference techniques described herein.

Model Training Operations

FIG. 4 is a flowchart diagram of an example process 400 for generating a calibration offset generation machine learning model. While various embodiments of the present invention describe generating a calibration offset generation machine learning model as being performed by the same computing entity as the computing entity used to generate predicted calibration offsets by utilizing the calibration offset generation machine learning model, a person of ordinary skill in the relevant technology will recognize that in some embodiments a first set of one or more computing entities may generate a calibration offset generation machine learning model and a second set of one or more computing entities may generate predicted calibration offsets by utilizing the calibration offset generation machine learning model.

The process 400 begins at step/operation 401 when the predictive data analysis computing entity 106 identifies a plurality of measurement environment features associated with a measurement device. In some embodiments, as part of step/operation 401, the predictive data analysis computing entity 106 identifies key signals within and external to the measurement device that are to be modeled in relation the measurement output. In some embodiments, step/operation 401 requires systems level knowledge of the measurement device to best identify the information sources that will drive the most impact on the measurement output over time after initial calibration of the measurement device.

In some embodiments, a measurement environment feature describes a property associated with an operational environment of a measurement device during a time associated with a corresponding measurement operation. Examples of measurement environment features comprise measurement device internal features that describe properties of a corresponding measurement device during a time associated with a corresponding measurement operation and measurement device external environment features that describe properties of an external environment of a measurement device during a time associated with a corresponding measurement operation.

In some embodiments, an internal measurement environment feature describes properties of a corresponding measurement device during a time associated with a corresponding measurement operation. Examples of measurement device internal features include electrical noise features. For devices that require an external power source unit (PSU), the ideal delta between "Earth ground" and "return direct current (DC)" signal line should be zero volts. Small variances in this delta can exist due to the varying PSU and variance in Printed Circuit Board Assembly (PCBA) components from device to device. This can ultimately impact signal accuracy and repeatability of measurement devices due to electrical noise impacting DC signal quality particularly for very low signal detection in the uA and pA territory. In some embodiments, being able to characterize how varying DC electrical noise impacts accuracy and monitoring and calibrating this out offers another way to improve device accuracy. Other examples of measurement device internal features include within-device component drift features. Within a measurement device, there may be thousands of components (e.g., electronic components, mechanical components, calibrators, reagents, and/or the like) that make up the solution. Each of these components may have specific design specifications and the final device then may have a required design specification. Each component may have individual variations in performance. In some embodiments, tapping into key signals within a measurement device and continually monitoring them and understanding how their changes impact the device measurement output is yet another opportunity to enhance measurement accuracy.

In some embodiments, an external environment measurement feature describes properties of an external environment of a measurement device during a time associated with a corresponding measurement operation. Examples of measurement device external environment feature include operational location features. In some embodiments, the operating position of a device can impact the accuracy and performance output of the device. For example, stray light variation through the day may impact an optical reading of a photo-diode. As another example, variations in the level of vibration in relation to an operating device may change through the day and impact repeatability of the operating device. Other examples of measurement device external environment feature include ambient temperature/humidity features. Many devices are designed to work within certain Lab operating conditions such as with particular temperature requirements and/or humidity requirements. In some cases, if the ambient temperature is too high and or low then the stability of the device may be unacceptable. Even within the acceptable specifications, temperature/humidity changes may impact the device output so continual fine tuning in relation to temperature and humidity is an opportunity for improved accuracy. Also, where a lab has an operating condition outside of proposed specifications, fine tuning of the impact on ground-truth model outputs can be useful.

At step/operation 402, the predictive data analysis computing entity 106 generates a set of inferred features by varying each measurement environment feature across a per-feature spectrum of the measurement environment feature, repeatedly performing a ground-truth measurement operation under simulated measurement conditions characterized at least in part by variations of the measurement environment feature, and generating an inferred feature during each performance of the ground-truth measurement operation as the measurement output for the ground-truth measurement operation. While various embodiments of the present invention describe generating inferred features by performing one ground-truth measurement operation via varying ground-truth measurement operations, a person of ordinary skill in the relevant technology will recognize that any number of ground-truth measurement operations (e.g., two or more blood cell count measurement operations for two or more synthetic blood products) may be performed to generate inferred features.

In some embodiments, step/operation 402 comprises collecting signal values across various devices and varying input features across their potential spectrums. In some embodiments, once key signals have been identified, there is a signal collection phase that is configured to collect internal device and external signals. To create a model that generalizes well across the measurement output range and from measurement device to external device, a proposed system may vary the input features across their potential spectrum and establish how they impact the output on multiple external devices. The objective of this signal collection across multiple external devices may be to enable a solution that robustly characterizes the process. In some embodiments, a proposed system varies the input features across their potential spectrum to characterize their impact on the measurement outputs. The proposed system may repeat this process at intervals across the measurement output ranges and for a set of multiple measurement devices.

In some embodiments, an inferred measurement is a measurement output of performing a ground-truth measurement operation using a measurement device while varying a corresponding measurement environment feature value of the measurement device. In some embodiments, given a measurement device that is associated with n measurement environment feature values for n measurement environment features, each of the n measurement environment features may be varied across a per-feature spectrum for the measurement environment feature. After every variation of a measurement environment feature, a ground-truth measurement operation may be performed to generate an inferred measurement. Accordingly, for example, given a measurement device that is associated with a measurement environment features, where each of the measurement environment features can have b potential values in its respective per-feature spectrum, the measurement device may be associated with up to a*b inferred features. As another example, given a measurement device that is associated with four measurement environment features, where the first measurement environment feature is associated with a potential values in its respective per-feature spectrum, the second measurement environment feature is associated with b potential values in its respective per-feature spectrum, the third measurement environment feature is associated with c potential values in its respective per-feature spectrum, and the first measurement environment feature is associated with d potential values in its respective per-feature spectrum, the measurement device may be associated with up to a+b+c+d inferred features.

Although various embodiments of the present invention describe that an inferred measurement is generated by performing a ground-truth measurement operation while varying one of the measurement environment features of the measurement device, a person of ordinary skill in the relevant technology that an inferred measurement is generated by performing a ground-truth measurement operation while varying more than one of the measurement environment features of the measurement device, for example, while varying up to m measurement environment features of the measurement device, where m may be a configurable hyper-parameter value.

In some embodiments, a ground-truth measurement operation is a measurement operation whose ideal (i.e., desired) measurement output is known independent of (i.e., without the need to resort to) the ground-truth measurement operation. Examples of ground-truth measurement operations include performing a measurement operation to determine a measured value for a particular property of a synthetic blood product, where the particular property of the synthetic blood product is already known. The ideal/desired measurement output associated with a ground-truth measurement operation is referred to herein as the "ground-truth measurement output" for the ground-truth measurement operation. For example, in some embodiments, if the ground-truth measurement operation aims to determine a measured value for white blood cell count of a particular synthetic blood product, the actual white blood cell count of the particular synthetic blood product might be known by virtue of the fact that the particular synthetic blood product is synthetic. In general, any synthetic and/or non-synthetic product can be used as an input for a ground-truth measurement operation so long as the ideal/desired property of the synthetic product is known independent of the ground-truth measurement operation.

In some embodiments, a per-feature spectrum for a measurement environment feature describes a set of potential values of the measurement environment feature across which the measurement environment features may be varied to generate inferred measurements in relation to a ground-truth measurement operation. In some embodiments, when the set of all potential/probable values of a measurement environment feature is a discrete set, the per-feature spectrum for the measurement environment feature may include all or part of the discrete set. In some embodiments, when the set of all potential/probable values of a measurement environment feature is a continuous set, the per-feature spectrum for the measurement environment may include a discrete subset of the continuous set, for example a discrete subset of the continuous set that includes values selected to be representative of the entire spectrum of the continuous set. For example, if a potential humidity measure of a measurement device is described by the set [1.01%, 2.00%], then the per-feature spectrum of the potential humidity measure future may include the set {1.01%, 1.02%, 1.03%, 1.04%, 1.05%, 1.06%, 1.07%, 1.08%, 1.09%, 2.00%}.

An operational example of varying a set of measurement environment features across per-feature spectrums for those measurement environment features is depicted in FIG. 5. As depicted in FIG. 5, each measurement environment feature that is designated in column 501 is varied at various timesteps across the measurement environment feature values denoted in columns 502. In some embodiments, the set of measurement environment feature values denoted in columns 502 for each measurement environment feature is the per-feature spectrum for the measurement environment feature.

Returning to FIG. 4, at step/operation 403, the predictive data analysis computing entity 106 generates the calibration offset generation machine learning model based at least in part on the set of inferred features and a ground-truth measurement output for the ground-truth measurement operation. In some embodiments, the predictive data analysis computing entity 106 generates an error function based at least in part on a measure of deviation between the set of inferred features and the ground-truth measurement output, where the error function is a function of parameters associated with the set of measurement environment features. In some embodiments, the predictive data analysis computing entity 106 performs an optimization of a gradient measure for the error function and adopts the parameters associated with the optimized function value as trained parameters of the calibration offset generation machine learning model.

In some embodiments, the calibration offset generation machine learning model comprises a recurrent neural network. In some embodiments, the recurrent neural network is configured to, during each current operational timestep that is associated with a sequenced measurement operation, determine a current hidden state for the current operational timestep based at least in part on the plurality of measurement environment feature values for the sequenced measurement operation and a preceding hidden state for a preceding operational timestep, and the predicted calibration offset for each sequenced measurement operation is determined based at least in part on the current hidden state for the current operational timestamp that is associated with the sequenced measurement operation. In some embodiments, the recurrent neural network is a long-short term memory network. In some embodiments, the long-short term memory network is a bidirectional long-short term memory network. In some embodiments, the bidirectional long-short term memory network is an attention-based bidirectional long-short term memory network with an attention mechanism. In some embodiments, inputs to a calibration offset generation machine learning model include vectors each characterizing a set of measurement environment feature values for a measurement operation. In some embodiment, the outputs of a calibration offset generation machine learning model include an atomic value representative of the predicted calibration offset for a measurement operation.

In some embodiments, the calibration offset generation machine learning model is generated using a model training routine that comprises, for each measurement environment feature value of a measurement operation of a measurement device: determining a plurality of inferred measurements by the measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and generating the calibration offset generation machine learning model based at least in part on comparing the plurality of inferred measurements and a ground-truth measurement output for the ground-truth measurement operation. In some embodiments, given a set of inferred measurements and a ground-truth measurement output for the ground-truth measurement operation that is used to generate the inferred measurements, for each inferred measurement that is associated with a simulated measurement condition defined by a set of measurement environment feature values, the calibration offset generation machine learning model is trained (e.g., using a training routine such as a ground-truth training routine comprising at least one of stochastic gradient descent, batch gradient descent, backpropagation, backpropagation through time, and/or the like) to detect a measure of deviation between the inferred measurement and the ground-truth measurement output based at least in part on the set of measurement environment feature values associated with the corresponding simulated measurement condition.

Accordingly, various embodiments of the present invention introduce techniques for generating calibration offset generation machine learning models that using a model training routine that comprises, for each measurement environment feature value: (i) determining a plurality of inferred measurements by a measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature;

and (ii) generating the calibration offset generation machine learning model based at least in part on comparing the plurality of inferred measurements and a ground-truth measurement output for the ground-truth measurement operation. Once generated, calibration offset generation machine learning models can be used to generate predicted calibration offsets, where the predicted calibration offsets can in turn be used to generate calibrated measurement outputs without performing measurement device recalibration. In this way, various embodiments of the present invention improve the computational efficiency of performing measurement device calibration management and reduce computational load on measurement device calibration management frameworks.

Predictive Inference Operations

FIG. 6 is a flowchart diagram of an example process 600 for generating a predicted calibration offset for a measurement operation using a calibration offset generation machine learning model. While various embodiments of the present invention describe generating a calibration offset generation machine learning model as being performed by the same computing entity as the computing entity used to generate predicted calibration offsets by utilizing the calibration offset generation machine learning model, a person of ordinary skill in the relevant technology will recognize that in some embodiments a first set of one or more computing entities may generate a calibration offset generation machine learning model and a second set of one or more computing entities may generate predicted calibration offsets by utilizing the calibration offset generation machine learning model.

The process 600 begins at step/operation 601 when the predictive data analysis computing entity 106 identifies a plurality of measurement environment feature values associated with the measurement operation. In some embodiments, once the calibration offset generation machine learning model has been trained to an acceptable level to predict how the variables impact accuracy and repeatability, the calibration offset generation machine learning model can be used in real time for ongoing calibration. One potential implementation of the invention for illustration is to create the solution to be completely independent of the device. In some embodiments, the signals from the device can be connected to a mobile or network via Bluetooth or Wi-Fi and transferred to the cloud for the model inference process which takes all the available signals and generates the projected offset versus ground-truth conditions using the trained model. The system can use any standard approach to collect data from the device, e.g., through analogue signals from within the device circuitry or from digital readings that might be useful and already available.

In some embodiments, a measurement environment feature value is a value for a measurement environment feature, where the measurement environment feature is configured to describe a property associated with an operational environment of a measurement device during a time associated with a corresponding measurement operation. Examples of measurement environment features comprise measurement device internal features that describe properties of a corresponding measurement device during a time associated with a corresponding measurement operation and measurement device external environment features that describe properties of an external environment of a measurement device during a time associated with a corresponding measurement operation.

Examples of measurement device internal features include electrical noise features. For devices that require an external power source unit (PSU), the ideal delta between "Earth ground" and "return direct current (DC)" signal line should be zero volts. Small variances in this delta can exist due to the varying PSU and variance in Printed Circuit Board Assembly (PCBA) components from device to device. This can ultimately impact signal accuracy and repeatability of measurement devices due to electrical noise impacting DC signal quality particularly for very low signal detection in the uA and pA territory. In some embodiments, being able to characterize how varying DC electrical noise impacts accuracy and monitoring and calibrating this out offers another way to improve device accuracy. Other examples of measurement device internal features include within-device component drift features. Within a measurement device, there may be thousands of components (e.g., electronic components, mechanical components, calibrators, reagents, and/or the like) that make up the solution. Each of these components may have specific design specifications and the final device then may have a required design specification. Each component may have individual variations in performance. In some embodiments, tapping into key signals within a measurement device and continually monitoring them and understanding how their changes impact the device measurement output is yet another opportunity to enhance measurement accuracy.

Examples of measurement device external environment feature include operational location features. In some embodiments, the operating position of a device can impact the accuracy and performance output of the device. For example, stray light variation through the day may impact an optical reading of a photo-diode. As another example, variations in the level of vibration in relation to an operating device may change through the day and impact repeatability of the operating device. Other examples of measurement device external environment feature include ambient temperature/humidity features. Many devices are designed to work within certain Lab operating conditions such as with particular temperature requirements and/or humidity requirements. In some cases, if the ambient temperature is too high and or low then the stability of the device may be unacceptable. Even within the acceptable specifications, temperature/humidity changes may impact the device output so continual fine tuning in relation to temperature and humidity is an opportunity for improved accuracy. Also, where a lab has an operating condition outside of proposed specifications, fine tuning of the impact on ground-truth model outputs can be useful.

At step/operation 602, the predictive data analysis computing entity 106 processes the plurality of measurement environment feature values using the calibration offset generation machine learning model to generate the predicted calibration offset. In some embodiments, the predicted calibration offset is a prediction about deviation of a measurement output of a measurement operation with a desired/ideal/actual value for the property that the corresponding measurement operation seeks to ideally/desirably measure/record/report. In some embodiments, the predicted calibration offset for a measurement operation is generated by processing a plurality of measurement environment feature values for the corresponding measurement operation using a calibration offset generation machine learning model. In some embodiments, inputs to a calibration offset generation machine learning model include vectors each characterizing a set of measurement environment feature values for a measurement operation. In some embodiment, the outputs of a calibration offset generation machine learning model include an atomic value representative of the predicted calibration offset for a measurement operation.

At step/operation 603, the predictive data analysis computing entity 106 performs one or more prediction-based actions based at least in part on the predicted calibration offset. In some embodiments, a predicted calibration offset is used to perform one or more prediction-based actions. In some embodiments, performing the one or more prediction-based actions comprises determining a calibrated measurement output based at least in part on the measurement output and the predicted calibration offset (e.g., based at least in part on the result of addition of the measurement output and the predicted calibration offset); and performing the one or more prediction-based actions based at least in part on the calibrated measurement output. In some embodiments, performing the one or more prediction-based actions comprises determining whether the predicted calibration offset satisfies a predicted calibration offset threshold; and in response to determining that the predicted calibration offset satisfies the predicted calibration offset threshold, automatically performing one or more device recalibration operations for the measurement device.

In some embodiments, performing the prediction-based actions comprises causing display of a prediction output user interface that displays the measurement output for a measurement operation, the predicted calibration offset for the measurement operation, and the calibrated measurement output for the measurement output. An operational example of such a prediction output user interface 700 is depicted in FIG. 7. As depicted in FIG. 7, the prediction output user interface 700 displays the measurement output 701 for a measurement operation, the predicted calibration offset 702 for the measurement operation, and the calibrated measurement output 703 for the measurement output.

In some embodiments, performing the prediction-based actions comprises causing display of a prediction output user interface that displays a measure of how much a set of measurement operations across time contribute to measures of device drift (e.g., to the predicted measurement offset measure). An operational example of such a prediction output user interface 800 is depicted in FIG. 8. As depicted in FIG. 8, the prediction output user interface 800 displays how much each measurement operation associated with a timestep contributes to a measure of device drift using the graph 801 and/or the bar chart 802. In the prediction output user interface 800, user interaction with each timestep icon associated with the time step (e.g., a timestep icon in the graph 801, a timestep icon in the bar chart 802, and/or the like) causes display of a prediction output user interface that displays, for the corresponding timestep, how measurement environment feature values associated with the measurement operation of the corresponding timestep have contributed to the measure of deice drift. An operational example of the latter type of a prediction output user interface 900 is depicted in FIG. 9. As depicted in FIG. 9, the prediction output user interface 900 describes a magnitude and a direction (e.g., positive or negative nature) of contribution of each measurement environment feature value for a corresponding measurement operation to the measure of device drift for the corresponding measurement operation.

In some embodiments, performing prediction-based actions comprises performing calibration management operations for one or more lab diagnostic devices. Lab diagnostic devices are critical to diagnosing and guiding patient healthcare in relation to chronic disease. Examples of such devices are Hematology analyzers that perform standard complete blood count measurements and immunology analyzers which run automated biochemical tests to detect the presence and concentration of substances in the samples. These lab diagnostic devices may be highly complex pieces of instrumentation encompassing electronics, mechanics, fluidics, chemicals, software and complex analytics to get critical diagnostic outputs to guide patient healthcare decisions. Due to the complexity of the noted lab diagnostic devices, it is very technically challenging to ensure the best possible ground truth accuracy and repeatability of measurements are maintained through time after calibration of these devices. As these lab diagnostic devices become more complex and their specification requirements become tighter, solutions to enable better accuracy and repeatability will be vital. For illustration purposes we outline some examples of where enhancing diagnostic accuracy of lab diagnostic devices would be beneficial.

Accordingly, as described above, various embodiments of the present invention introduce techniques for generating predicted calibration offsets for measurement operations that can in turn be used to generate calibrated measurement outputs. By providing functionalities that are configured to generate calibrated measurement outputs without performing measurement device recalibration, various embodiments of the present invention reduce the number of device recalibration operations that need to be performed on measurement devices. In doing so, various embodiments of the present invention improve the computational efficiency of performing measurement device calibration management and reduce computational load on measurement device calibration management frameworks.

For example, various embodiments of the present invention introduce techniques for generating predicted calibration offsets by utilizing calibration offset generation machine learning models, where the noted calibration offset generation machine learning models that are generated using a model training routine that comprises, for each measurement environment feature value: (i) determining a plurality of inferred measurements by a measurement device in relation to a ground-truth measurement operation via performing the ground-truth measurement operation under simulated measurement conditions characterized at least in part by varying a measurement environment feature that is associated with the measurement environment feature value across a per-feature spectrum for the measurement environment feature; and (ii) generating the calibration offset generation machine learning model based at least in part on comparing the plurality of inferred measurements and a ground-truth measurement output for the ground-truth measurement operation. Once generated, predicted calibration offsets can be used to generate calibrated measurement outputs without performing measurement device recalibration. In this way, various embodiments of the present invention improve the computational efficiency of performing measurement device calibration management and reduce computational load on measurement device calibration management frameworks.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving, by one or more processors, a plurality of measurement environment feature values of a troponin measurement device, wherein the plurality of measurement environment feature values (i) is associated with a measurement operation associated with a measurement output of the troponin measurement device and (ii) comprises one or more internal features, associated with a physical component of the troponin measurement device, and one or more external environment features, associated with an environment in which the troponin measurement device is operating;
inputting, by the one or more processors, the plurality of measurement environment feature values to a machine learning model to receive a predicted calibration offset, wherein the predicted calibration offset comprises a measure of device drift of the physical component of the troponin measurement device, and wherein the machine learning model is trained based at least in part by:
(i) determining a plurality of inferred measurements by the troponin measurement device in relation to a ground-truth measurement operation via performing the ground-truth measurement operation under one or more simulated measurement conditions characterized at least in part by varying a measurement environment feature that is associated with a measurement environment feature value of the plurality of measurement environment feature values across a per-feature spectrum for the measurement environment feature, and
(ii) comparing the plurality of inferred measurements and a ground-truth measurement output for the ground-truth measurement operation; and
in response to a determination that the predicted calibration offset satisfies a predicted calibration offset threshold, automatically performing, by the one or more processors, a device recalibration operation for the physical component of the troponin measurement device.

2. The computer-implemented method of claim 1, wherein the machine learning model comprises a recurrent neural network.

3. The computer-implemented method of claim 2, wherein:
the measurement operation is part of a temporal sequence of measurement operations that comprises a plurality of sequenced measurement operations,
the recurrent neural network is configured to, during a current operational timestep that is associated with a sequenced measurement operation, determine a current hidden state for the current operational timestep based at least in part on the plurality of measurement environment feature values for the sequenced measurement operation and a preceding hidden state for a preceding operational timestep, and
the predicted calibration offset for the sequenced measurement operation is determined based at least in part on the current hidden state for the current operational timestep that is associated with the sequenced measurement operation.

4. The computer-implemented method of claim 2, wherein the recurrent neural network is a long-short term memory network.

5. The computer-implemented method of claim 4, wherein the long-short term memory network is a bidirectional long-short term memory network.

6. The computer-implemented method of claim 5, wherein the bidirectional long-short term memory network is an attention-based bidirectional long-short term memory network with an attention mechanism.

7. A system comprising:
one or more processors; and
at least one memory storing processor-executable instructions that, when executed by any one or more of the one or more processors, causes the one or more processors to perform operations comprising:
receive a plurality of measurement environment feature values of a troponin measurement device, wherein the plurality of measurement environment feature values (i) is associated with a measurement operation associated with a measurement output of the troponin measurement device and (ii) comprises one or more internal features, associated with a physical component of the troponin measurement device, and one or more external environment features, associated with an environment in which the troponin measurement device is operating;
input the plurality of measurement environment feature values to a machine learning model to receive a predicted calibration offset, wherein the predicted calibration offset comprises a measure of device drift of the physical component of the troponin measurement device, and wherein the machine learning model is trained based at least in part by:
(i) determining a plurality of inferred measurements by the troponin measurement device in relation to a ground-truth measurement operation via performing the ground-truth measurement operation under one or more simulated measurement conditions characterized at least in part by varying a measurement environment feature that is associated with a measurement environment feature value of the plurality of measurement environment feature values across a per-feature spectrum for the measurement environment feature, and
(ii) comparing the plurality of inferred measurements and a ground-truth measurement output for the ground-truth measurement operation; and
in response to a determination that the predicted calibration offset satisfies a predicted calibration offset threshold, automatically performing, by the one or more processors, a device recalibration operation for the physical component of the troponin measurement device.

8. The system of claim 7, wherein the machine learning model comprises a recurrent neural network.

9. The system of claim 8, wherein:
the measurement operation is part of a temporal sequence of measurement operations that comprises a plurality of sequenced measurement operations,
the recurrent neural network is configured to, during a current operational timestep that is associated with a sequenced measurement operation, determine a current hidden state for the current operational timestep based at least in part on the plurality of measurement environment feature values for the sequenced measurement operation and a preceding hidden state for a preceding operational timestep, and the predicted calibration offset for the sequenced measurement operation is determined based at least in part on the current hidden state for the current operational timestep that is associated with the sequenced measurement operation.

10. The system of claim 8, wherein the recurrent neural network is a long-short term memory network.

11. The system of claim 10, wherein the long-short term memory network is a bidirectional long-short term memory network.

12. The system of claim 11, wherein the bidirectional long-short term memory network is an attention-based bidirectional long-short term memory network with an attention mechanism.

13. One or more non-transitory computer-readable storage media including instructions that, when executed by one or more processors, cause the one or more processors to:

receive a plurality of measurement environment feature values of a troponin measurement device, wherein the plurality of measurement environment feature values (i) is associated with a measurement operation associated with a measurement output of the troponin measurement device and (ii) comprises one or more internal features, associated with a physical component of the troponin measurement device, and one or more external environment features, associated with an environment in which the troponin measurement device is operating;

input the plurality of measurement environment feature values to a machine learning model to receive a predicted calibration offset, wherein the predicted calibration offset comprises a measure of device drift of the physical component of the troponin measurement device, and wherein the machine learning model is trained based at least in part by:

(i) determining a plurality of inferred measurements by the troponin measurement device in relation to a ground-truth measurement operation via performing the ground-truth measurement operation under one or more simulated measurement conditions characterized at least in part by varying a measurement environment feature that is associated with a measurement environment feature value of the plurality of measurement environment feature values across a per-feature spectrum for the measurement environment feature, and (ii) comparing the plurality of inferred measurements and a ground-truth measurement output for the ground-truth measurement operation; and in response to a determination that the predicted calibration offset satisfies a predicted calibration offset threshold, automatically performing, by the one or more processors, a device recalibration operation for the physical component of the troponin measurement device.

14. The one or more non-transitory computer-readable storage media of claim 13, wherein the machine learning model comprises a recurrent neural network.

15. The one or more non-transitory computer-readable storage media of claim 14, wherein:

the measurement operation is part of a temporal sequence of measurement operations that comprises a plurality of sequenced measurement operations, the recurrent neural network is configured to, during a current operational timestep that is associated with a sequenced measurement operation, determine a current hidden state for the current operational timestep based at least in part on the plurality of measurement environment feature values for the sequenced measurement operation and a preceding hidden state for a preceding operational timestep, and the predicted calibration offset for the sequenced measurement operation is determined based at least in part on the current hidden state for the current operational timestep that is associated with the sequenced measurement operation.

16. The one or more non-transitory computer-readable storage media of claim 14, wherein the recurrent neural network is a long-short term memory network.

17. The computer-implemented method of claim 1, wherein:

the one or more internal features comprise an electrical noise level or a within-device component drift; and the one or more external environment features comprise an operating position, a level of vibration, a temperature, or a humidity level.

\* \* \* \* \*